July 21, 1970 W. ULLMANN ET AL 3,521,021
ELECTRO-EROSION MACHINE INCLUDING SEPARATELY CONTROLLABLE
ELECTRODE SUPPORT MOUNTING MEANS AND FEEDING MEANS
Filed Aug. 22, 1966 6 Sheets-Sheet 2
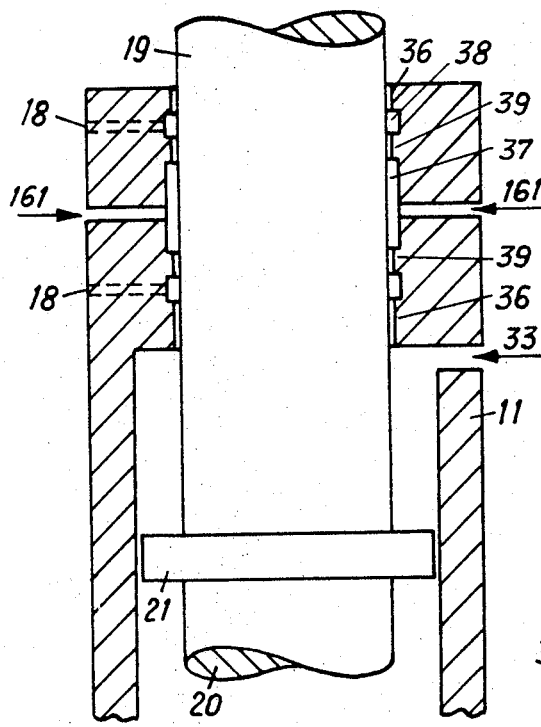
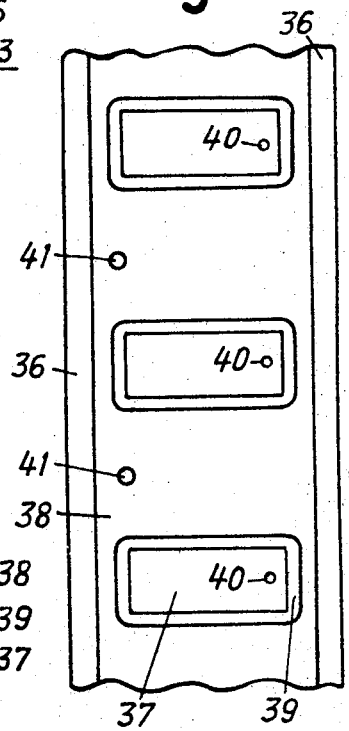
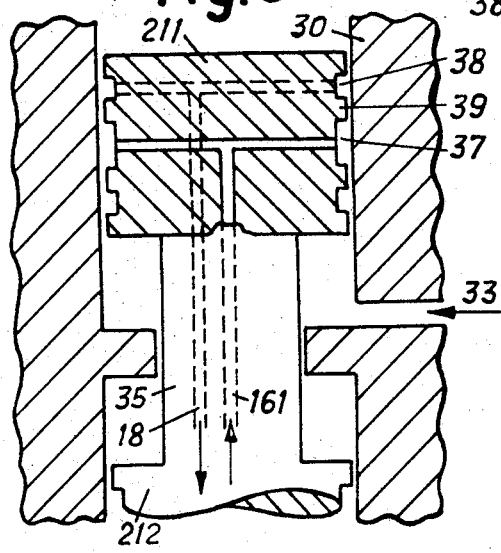
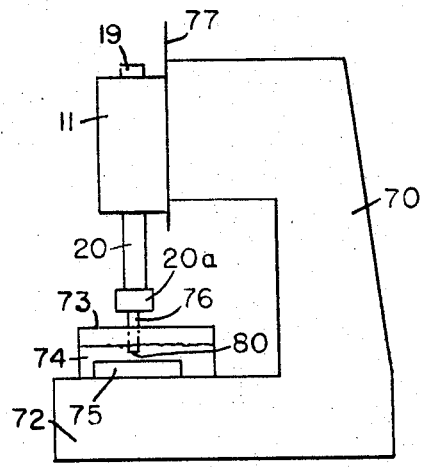

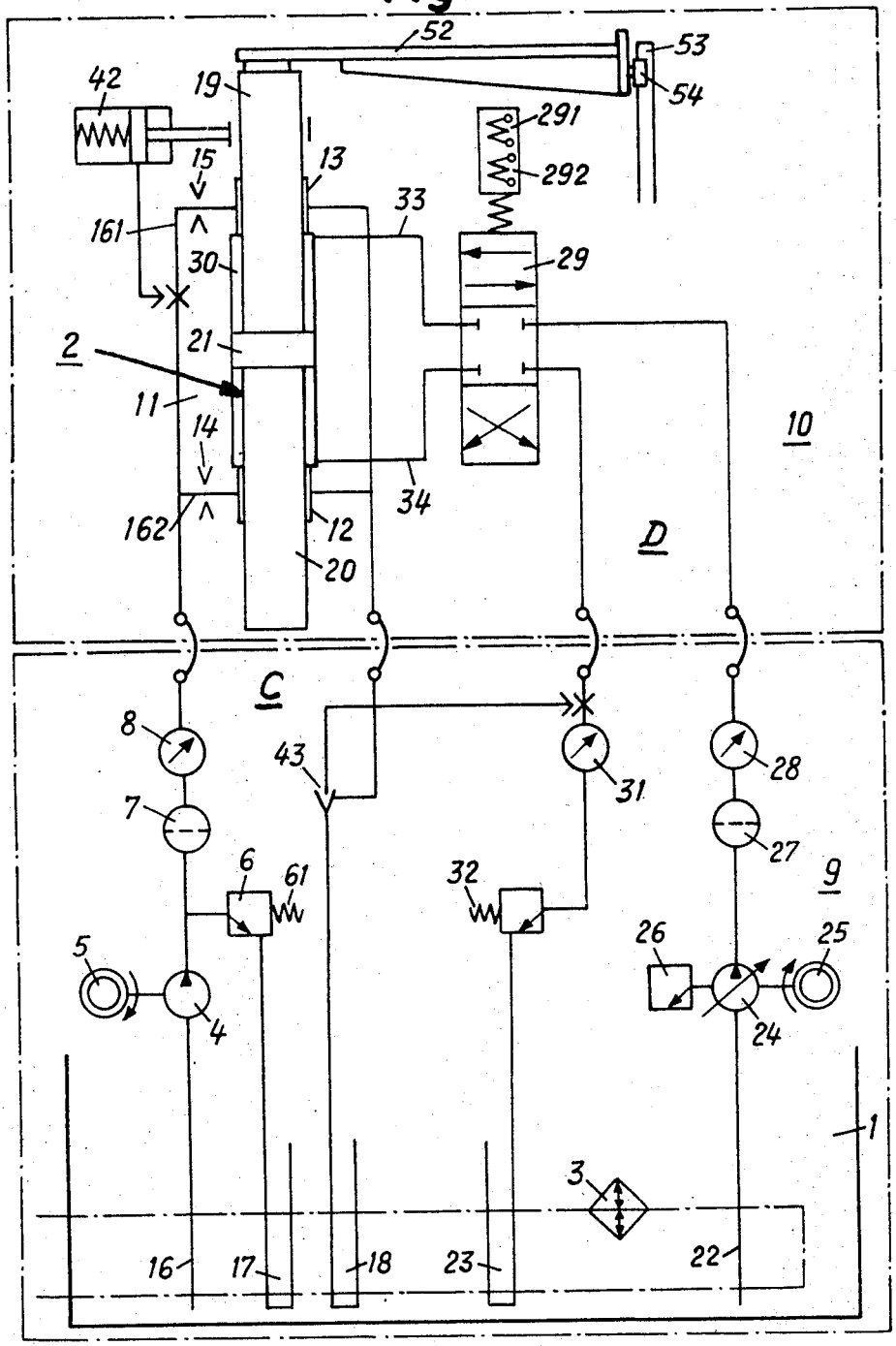

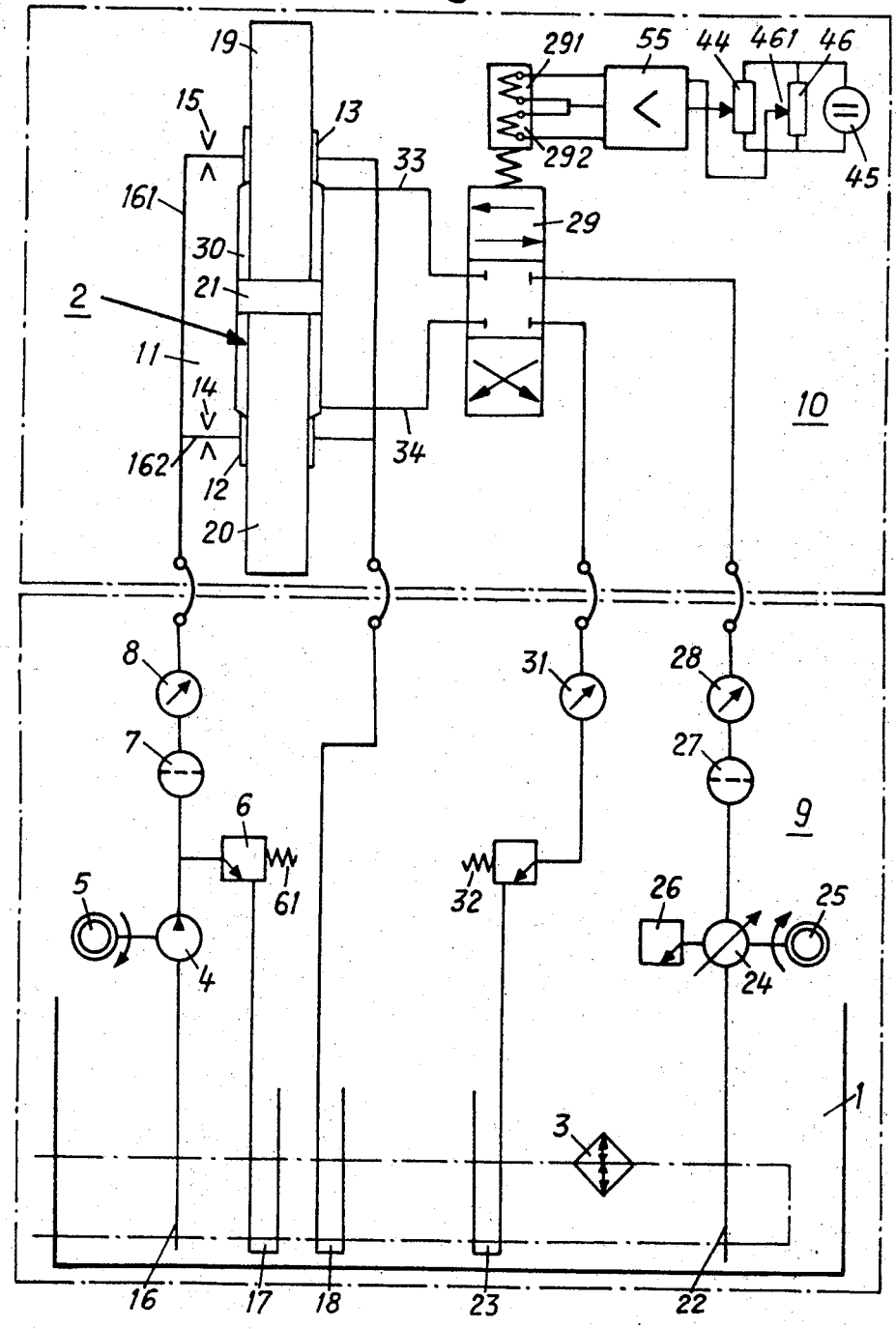

United States Patent Office 3,521,021
Patented July 21, 1970

3,521,021
ELECTRO-EROSION MACHINE INCLUDING SEPARATELY CONTROLLABLE ELECTRODE SUPPORT MOUNTING MEANS AND FEEDING MEANS
Werner Ullmann, Locarno, Rudolf Ineichen, Effretikon, and Fritz Lutolf, Losone, Switzerland, assignors to A.G. fur Industrielle Elektronik Agie Losone B. Locarno, Losone-Locarno, Switzerland, a corporation of Switzerland
Filed Aug. 22, 1966, Ser. No. 574,028
Claims priority, application Switzerland, Aug. 20, 1965, 11,753/65
Int. Cl. B23p 1/08, 1/04
U.S. Cl. 219—69        1 Claim

ABSTRACT OF THE DISCLOSURE

An electro-erosion machine including a cylinder means, piston means within the cylinder means and including oppositely directed projecting rod portions, one of which constitutes an electrode support, controllable means for establishing a fluid film bearing surface at axially spaced locations of said rod portions and separate and independently controllable means for supplying and exhausting pressure fluid to and from the cylinder means on opposite sides of the piston and including electromagnetically operated valve means and a control circuit for said valve means operable to actuate said valve means to impart axial movement to said piston means and thus said electrode support to effect at least one of a manually controlled electrode feed movement, an automatically regulated feed movement, and a feed movement including imparting vibratory movement to the electrode.

---

The present invention relates to an improved method of, and also means for, the hydraulic mounting of an element consisting of a spindle sleeve moving in bearing bushings or shells, in combination with a hydraulic driving system.

As is known, the movement of a mounted element is always dependent on its support or mounting. In special situations where there is to be performed small and precise movements of the element, the friction of the mounting constitutes a serious problem. For example, in connection with a feed device in electro-erosive or other machine tools, if there are required small movements of the tool in the direction of the workpiece to be machined, while at the same time good guiding and rigidity in the transverse direction, there automatically results a tightly fitting mounting with all the disadvantages as regards the feeding of the tool.

With prior known tool feed devices, a mechanical mounting (smooth surfaces or roller bearings) was used with electro-mechanical, hydro-mechanical or hydraulic and other feed components.

Now, the present invention has in mind for one of its primary objects to combine the advantages of a practically frictionless mounting with the advantages of a fine and accurate feed, so that the mutually exclusive conditions, namely, high rigidity in the transverse direction without appreciable friction are combined with a precise feeding of a tool, i.e. a machining electrode for instance, which is accurate to a thousandth of a millimeter.

An additional object of the invention can be seen to reside in the elimination of harmful moments of rotation at the hydraulic mounting in that, the hydraulic drive is arranged in relation to the hydraulic mounting such that the driving forces act at that position on the component or element to be moved where the center of gravity is situated.

Another object of the present invention is manifested by a particular constructive association of the hydraulic mounting and the hydraulic drive with the component or part which is to be moved. As a result, either the part, for example the holding means of the tool or the feeding device itself, can be displaced. Displacement of the feed device relative to the fixed tool-holding means is advantageous, as a so-called coarse setting, if the optimum spacing between the workpiece to be machined and the feed device with the holding means and the tool is to be adjusted before the machining operation.

The method according to the present invention is characterized by the features that, the spindle sleeve or tail spindle in the bearing is acted upon and pretensioned by transverse forces produced by a power medium which can be controlled in a first control circuit, while utilizing a very sensitive hydrostatic relief or unloading effect, and that the position of the spindle relative to the bearing is altered by the action on a pressure chamber of the power medium controlled in a second control circuit, said pressure chamber being arranged practically co-axially of the bearing and at the center of gravity of the spindle.

The means required for carrying out the inventive method are characterized by the features that, the spindle mounted without play at one or more bearing locations or positions is under the pretension of the power medium in at least three supporting points for each such bearing position and is surrounded by at least one pressure chamber arranged co-axially of the bearing positions and also at the center of gravity of the spindle for the purpose of changing the relative local position between the bearing and spindle.

The inventive method and means have particular applicability insofar as the hydraulic mounting and the hydraulic drive are employed for the relative displacement of the bearing or spindle in a feed device for a machine which machines metal by electro-erosion.

The invention will be better understood, and objects other than those set forth above, will become apparent, when consideration is given to the following detailed description thereof. Such description makes reference to the annexed drawings wherein:

FIG. 1 schematically depicts a first structural embodiment of apparatus utilizing the combination of hydraulic mounting and hydraulic drive;

FIG. 2 schematically illustrates, on an enlarged scale, an arrangement of the spindle or tailstock center sleeve consisting of a piston and two piston rods in a bearing shell or bearing;

FIG. 3 shows another construction of the tailstock center sleeve or spindle in a bearing;

FIG. 4 is a development of a bearing with three supporting locations or points;

FIGS. 5 to 8 show other constructional examples with different additional components in the regulating and control circuit; and FIG. 9 schematically depicts the general overall arrangement of electro-erosive metal working machine with which the structure of FIGS. 1 to 8 can be employed.

Figure 1:
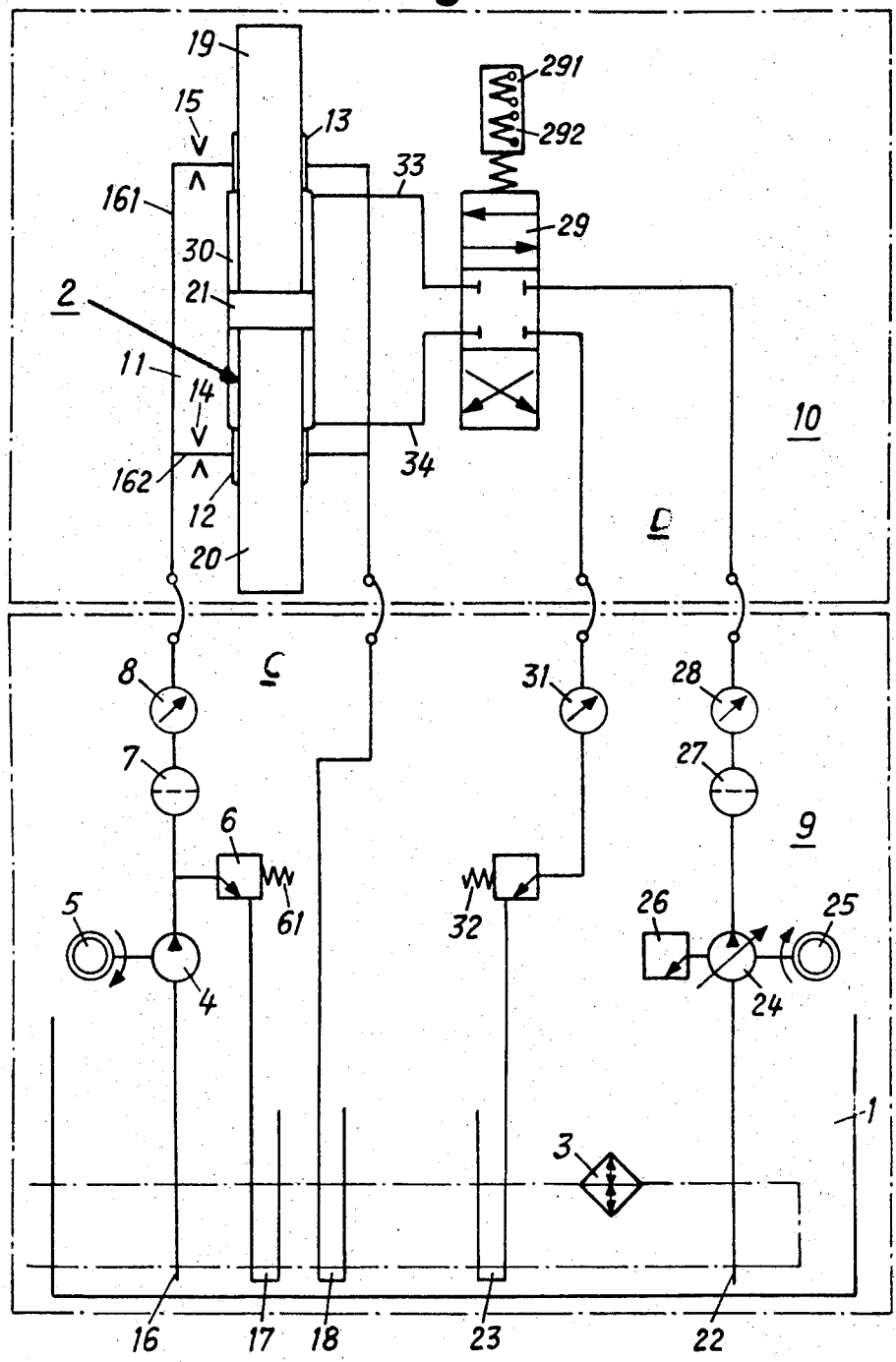

Describing now the drawings, it will be understood that in FIG. 1, the regulating or control circuit for the support or mounting of the spindle or tailstock center sleeve 2 and the control circuit for the feed movement of said tailstock center sleeve or spindle 2 are fed from the oil tank or reservoir 1. A heat exchanger 3 advantageously maintains the oil at constant temperature. The first mentioned control circuit, generally indicated by reference numeral C, will initially be described. Situated at the supply side 16 of this control circuit C is a high pressure delivery pump 4 which is driven by a suitable electric motor 5. A pressure-limiting or relief valve 6 with adjustable spring force 61 provides for a constant oil pressure of, for example, 200 atmospheres absolute pressure. A fine filter 7 and an indicating instrument 8 for the oil pressure are also provided. The connection between the hydraulic installation 9 and the actual feed device 10 can be effected by way of flexible conduits. This is schematically shown by way of appropriate symbols with all pressure lines.

Before entering the bearing housing or box 11, the supply side 16 of the control circuit C is branched off or distributed to the different bearings or bearing locations 12 and 13. To preserve clarity in illustration of the drawings, only two such branch pipes 161, 162 are shown. The bearings or bearing positions 12 and 13 are hereinafter more fully described with reference to FIGS. 2, 3 and 4. Each branch pipe 161, 162 either has a proportioning device or a diaphragm or a membrane-type throttle. These three types of expedients are generally indicated by reference numerals 14 and 15. The reason for using a proportioning device or diaphragm or throttle will be described later with reference to FIG. 2. In the bearing sleeves or bushes 12, 13 the fluid medium i.e. oil forms a practically frictionless mounting of the two piston rods 19 and 20, because the oil flows into the pressure spaces 37 and passes by way of the liquid gap into the relief spaces 38, as will be more fully explained shortly with reference to FIG. 2. The pressure difference in the liquid gap is of great importance as regards the support or mounting. The return pipe 18 is connected to the relief spaces 38 of each bearing bush or shell 12, 13 and returns the oil to the reservoir or tank 1. The excess oil from the pressure-limiting valve 6 is also returned by the pipe 17 to the oil reservoir or tank 1.

Only two bearing bushes or shells 12 and 13 are shown, but it is also possible for a greater number of such bearing shells to be arranged on the two piston rods 19 and 20.

The second control circuit D for the feed of the tailstock center spindle 2 consisting of the piston rods 19, 20 and piston 21 comprises the flow pipe 22 and the return pipe 23. Arranged in the flow pipe 22 is a delivery pump 24 driven by an electric motor 5 and provided with a pressure-limiting valve 26. This pump 24 generates a mean pressure of about 100 atmospheres and is self-regulating. A filter 27 and an instrument 28 for indicating oil pressure are provided forwardly of an electromagnetic control valve 29 arranged at the bearing housing 11. The quantity of flowing oil is controlled by the control valve 29 by means of the two electromagnetic coils 291, 292 and a reversal in the direction of the oil flowing into the pressure chamber 30 of the bearing housing 11 is effected, one time, by the feed or flow pipe 22 being connected to the pressure pipe 33 and, another time, when the flow pipe 22 is connected to the pressure pipe 34. The action of the control valve 29 is shown by the arrow symbols.

It will also be recognized that the piston 21 of the spindle 2 is contained in the cylinder or pressure chamber 30. Depending upon whether the power medium flows into the pressure chamber or cylinder 30 via the pipe 33 or via the pipe 34, the tailstock center spindle 2 consisting of the piston 21 and piston rods 19, 20, moves downwardly or upwardly. When the piston 21 is of cylindrical cross-section, the pressure chamber 30 is constructed as a so-called pressure cylinder. With a polygonal cross-section of such piston, the pressure chamber is correspondingly also of polygonal form.

In the embodiment of FIG. 1, a vertical movement of the tailstock spindle 2 is shown, but it is readily possible to effect any other direction of movement. Normally, there is arranged on the piston rod 20 a clamping device 20a (FIG. 9) for the tool, e.g. a machining electrode 76 with electro-erosion machines. The oil flows from the control valve 29 into the return pipe 23 via a pressure-indicating instrument 31 and a pressure-limiting valve 32 and then back into the tank 1. The provision of the pressure-limiting valve 32 produces the effect that there is also pressure in the return pipe 23, this pressure being, for example, 5 to 10 atmospheres smaller than in the feed or flow pipe 22, so that there is a small pressure difference on both sides of the piston 21. This difference is substantially smaller than the absolute values of the pressures in the flow pipe and return pipe. As a result, there is obtained the known advantages that small feed movements of the tailstock center spindle 2 can be accurately carried out, that the seal between the piston 21 and the wall of the cylinder 30 can have a large running clearance, and that the oil can flow from the bearing shells 12, 13 into the cylinder 30 as so-called leakage oil without any disadvantage on the complete feeding and mounting system. From FIG. 1 it will be recognized that the same power medium is used by means of the regulating or control circuit C for the mounting or support of the tailstock spindle 2 and by means of the control circuit D for the feeding movement of said spindle 2 in one or the other direction.

In addition, FIG. 1 shows the constructive association of the hydraulic mounting and hydraulic drive means. The pressure cylinder 30 is arranged co-axially of the two bearings locations or bearings shells 12, 13 and lies at the center of gravity of the tailstock center spindle 2, in the constructional example embodying the two piston rods 19, 20 and piston 21. By this particular association of the mounting and drive means, small torques are produced in the bearing shells which are able to deflect the spindle 2 transversely. An additional advantage results in that, in one case the spindle 2 is axially displaceable between the bearing shells 12, 13 and the pressure cylinder 30, and in another case, the complete feeding arrangement consisting of bearing shells 12, 13 and pressure cylinder 30 can be displaced axially in relation to the fixed tailstock spindle 2. Expressed in other words, by the relative change in position between the spindle, on the one hand, and the bearing shells and pressure cylinder, on the other hand, the component which is not fixed (either the feed device or the spindle) moves.

During the normal machining operation, the tail stock center spindle 2 is moved in the bearing shells 12, 13 and pressure cylinder 30, since the feed device is fixed on the frame 70 of the electro-erosion machine (FIG. 9). Before the machining operation, the spindle 2 is secured by means of the schematically depicted clamping device 42 depicted in FIG. 5. The fixing of the bearing shells 12, 13 and pressure cylinder 30 on the frame of the electro-erosion machine can then be released and displaced by the power medium in the second control circuit relative to the tailstock spindle. By this means, the optimum spacing between the complete feeding arrangement on which the tool and the holding means are arranged and the workpiece which is thereafter to be machined can be so adjusted that the subsequent machining operation can be effected without interruption solely by the movement of the spindle. There is thus obtained the additional advantage that the length of the pressure cylinder 30, which is known to determine the length of travel of the entire axial displacement can be kept very small. With longer travels, which frequently occur with specific machining operations, the pressure cylinder is displaced axially in relation to the fixed tailstock spindle, so that the small length of travel determined by the compact constructional form of the pressure cylinder can be lengthened in advantageous manner several times by displacement of the pressure cylinder on the fixed tailstock spindle.

In FIG. 2, the bearing portion or bearing shell 13 is shown greatly enlarged. There is clearly seen in section the two seals or stops 36, the pressure space 37, the relief space 38 and the raised bearing surface 39 extending between the latter. The oil is pumped into the pressure space 37 through the flow pipe 161 and the oil is drawn off from the relief space 38 through the return pipe means 18. This return pipe means 18 is shown in broken lines in the bearing 11. The piston rod 19 has a diameter which is slightly smaller than the diameter between the bearing surfaces 39, so that there is a large clearance of, for example, 0.5 millimeter between the two. Since the other piston rod 20 is exactly mounted in like manner in the other bearing 12 it therefore has not been shown. When the oil flows via pipe 161 into the pressure space or pocket 37, of which there are a relatively large number on the inner periphery of the bearing shell 13, as best seen in FIG. 4, it forms an oil film between the bearing surface 39 and piston rod 19, on account of the hydrostatic pressure difference of 200 atmospheres absolute pressure in the pressure space and zero atmospheres absolute pressure in the relief space 38. Due to this hydrostatic relief or unloading effect, transverse forces are set up which initially tension the piston rod and thus the entire tailstock center spindle 2. The thereby produced rigidity of the aforesaid spindle against transverse deflection depends upon the number of supporting points in the bearings 12, 13. Defined as supporting point is a pressure space or pocket 37 with the space 38 surrounding it, the latter of which is known as relief space. These two spaces being separated by a projecting bearing surface 39 of rectangular form. It has been found that three and more supporting points just provide a perfect rigidity of the spindle 2.

Experiments have also shown that, with four and five supporting points, which are uniformly distributed over the internal surface of the bearing shells 12, 13, the rigidity of the spindle 2 is not changed when forces of different value are applied at different angles of incidence to the spindle in order to deflect it against the bearing pressure, without there taking place any mechanical contact between the piston rod and the bearing surface. Forces up to 318 kilograms acting in different directions at an angle from 0° to 360° only produced deflections in the tailstock spindle of $\frac{1}{1000}$ to $\frac{6}{1000}$ millimeter. If the piston rods 19, 20 and the bearing shells 12, 13 have previously been shown cylindrical, this clearly does not intend to imply that the hydraulic mounting is only satisfactory for this shape. The same tests were carried out on piston rods having the cross-sectional form of a three-edged, four-edged or five-edged prism, the bearing shells obviously having the corresponding shape. The results were in some cases even more favorable than with the cylindrical cross-sectional configuration. Although the cylindrical tailstock spindle 2 has been shown without any means which safeguard against twisting movement in the description of FIG. 1, this has only been done to preserve clarity in illustration. In reality, the cylindrical spindle has a device securing it against turning or twisting movement about its axis, such as that which is, for example, shown later in FIG. 5 and identified by the reference numerals 52, 53, 54. With polygonal piston rods, obviously no such device for preventing twisting movement is required.

So far, the general operation of the hydraulic mounting with the use of a very sensitive hydrostatic relief or unloading effect has been described. It will now be explained that basically two principles exist for producing this relief or unloading effect. In one case, the relief effect can be obtained by the previously considered proportioning devices 14, 15 or otherwise arranged in the pipe 161, 162 of the flow system 16 in FIG. 1. These proportioning devices 14, 15 or otherwise are known to the art, and consequently, will not be more fully dealt with here. It is only pointed out, however, that the power medium is always delivered in the same quantity to the pressure pockets or spaces 37 by means of the aforesaid proportioning devices.

The same relief effect can be achieved by providing diaphragms 14, 15 of a certain diameter in the supply pipes 161, 162. These diaphragms can be situated as several diaphragms in series one behind the other. They can also be provided as a single diaphragm. By means of the series arranged diaphragms the power medium is always delivered with the same pressure to the pressure pockets or spaces 37. When working with a pressure of about 200 atmospheres absolute pressure in the flow or supply section 16, the diameter of the diaphragm can be chosen to be large. By doing this, it is possible to avoid any existing danger of soiling of the diaphragm. Furthermore, a smaller pressure difference is produced at the diaphragm and this, in turn, increases the rigidity of the tailstock spindle.

The same relief or unloading effect can be obtained by the provision of membrane-type throttle devices 14, 15 in the supply pipes 161, 162. The advantage obtained with these throttle devices is that the liquid gap is always kept constant. Such throttle devices are regulated to a constant liquid gap in dependence upon the actual loading of the bearing between the bearing shells 12, 13 and the piston rods 19, 20. By this means, there is obtained a practically infinite rigidity of the oil film between the bearing surfaces 39 and the piston rod 19 or 20. By virtue of the membrane-type throttle devices the quantity of power medium flowing into the pressure pockets or spaces is increased when a larger bearing pressure is set up. Regulation of the quantity of the power medium is achieved by a membrane arranged in the throttle device, which increases the flow opening from the supply system into the pressure pockets or spaces 37 when the bearing pressure is increased. Since such membrane-type throttle devices are known, they are not further dealt with here.

FIG. 3 shows another constructional example of hydraulic support or mounting. Two pistons 211 and 212 interconnected by a piston rod 35, exhibit on their surfaces the pressure pockets or spaces 37, the relief or unloading spaces 38 and bearing surfaces 39. The power medium is supplied via the supply or infeed conduit 161 formed in the aforesaid pistons 211, 212 and in the piston rod 35. The power medium discharges from the relief pockets or spaces 38 by way of the return conduit 18, only shown in broken lines. The power medium passes from the control valve 29 through the agency of the conduit 33 into the cylinder 30. The other pressure line 34 from the control valve 29 has not been shown so as to preserve clarity. In contradistinction to FIG. 2, FIG. 3 is primarily intended to show that the pressure pockets or spaces 37, relief spaces 38 and bearing surfaces 39 can also be arranged at the piston instead of in the cylinder.

FIG. 4 depicts a fragmentary view of a developed projection of a cylindrical bearing shell in the plane of the drawing. Three pressure pockets or spaces 37 are shown, these being bounded or delimited by the raised bearing surfaces 39. The relief or unloading spaces 38 are represented by the space situated around these bearing surfaces 39. The power medium enters the pressure spaces 37 via the supply pipe 161 or 162 at the associated aperture or hole 40. The aperture or holes 41, arranged in the relief spaces 38, serve for the discharge of the power medium flowing from the pressure spaces 37 via the bearing surface 39. The bearing shell is provided top and bottom with two sealing devices 36. The bearing surfaces 39 have a height of 1 to 3 millimeters from the bottom of the pressure space or relief space, whereby the aforesaid spaces are actually formed. The piston rod 19 or 20 adjoins these bearing surfaces 39 with a large clearance of a few tenths of a millimeter. Since the pressure difference between the pressure space and the relief space is very high, a film of oil is formed on the bearing surface 39, also between the surface of the piston rod. Such film flows from the pressure spaces to the relief space, so that a hydrostatic relief or unloading effect is provided on the bearing surfaces. The sealing devices 36 do not have to end accurately with the piston rod 19 or 20, since practically no leakage oil from the relief spaces 38 can discharge from the bearing shell 12 or 13.

FIG. 5 shows the same constructional embodiments as in FIG. 1 and, consequently, the same reference characters have also been once again essentially used. The only difference is that a hydraulic clamping means or device 42 is provided at the piston rod 19. This clamping device 42 is intended to serve for clamping the tailstock center spindle 2 in its momentary position at the time if, for example, there is no oil pressure in the control circuit. By this measure the spindle 2 is prevented from descending when the control circuit is switched off, so that the tool arranged on the piston rod 20 does not damage the workpiece to be machined. Furthermore, the clamping device 42 is also intended for the situation already mentioned above, where the tool is positioned on the workpiece to be machined before the machining operation in order to render possible a displacement of the entire bearing housing 11 relative to the secured spindle 2, whereby there is obtained a best possible spacing between the workpiece to be machined and the necessary feed travel of the spindle during the machining operation.

Another small modification in FIG. 5 is the suction pump 43. It serves to pump back any possibly occurring leakage oil from the two bearing shells 12 and 13.

FIG. 5 also shows means for preventing twisting or turning movement, and which must be arranged on the spindle when this is of cylindrical form. This anti-twist means or device consists essentially of a transverse support 52 fixed at one of its ends to the piston rod 19 and comprises on its other end a sliding means 54 which is guided in a rail 53. This rail 53 is a part of the frame of the machine. By this arrangement, as already mentioned, twisting of the tailstock spindle 2 about its axis is avoided when said spindle is moved upwardly or downwardly. As already mentioned above, the same applies when the bearing 11 is displaced relative to the spindle 2 fixed by means of the clamping device 42.

FIG. 6 depicts a constructional embodiment having an additional electrical arrangement acting upon the control valve 29. This electrical arrangement, consisting of a potentiometer 44, is provided between the electro-magnetic coils 291, 292 of the control valve 29 and the voltage source 45, for the manual adjustment of the spindle 2. A generally known amplifier 55 serves to amplify the electric signals. Prior to the electro-erosive machining operation, that is to say when the tool, i.e. the machining electrode, is to be adjusted to a correct spacing relative to the workpiece to be machined, the potentiometer 44 is rotated and thereby the resistance of the electro-magnetic coil 292 is so altered and thus the control valve 29 influenced that the spindle can be slowly lowered. The advantage in this case is that the lowering movement can be carried out accurately according to the weight of the spindle and machining electrode. Furthermore, the electric control arrangement comprises a further potentiometer or variable resistor 46, the resistance value of which is determined by the actual position of the spindle because of the tap 461 which is mechanically connected to the piston rod 19. By this change in resistance on the electro-magnetic coils 291, 292, the control valve 29 is so influenced by the feedback signal during the electro-erosive machining operation, that is to say, during the downward feed movement of the spindle 2, that a constant feed is provided; the weight of the spindle and possible disturbances in the control circuit being automatically allowed for.

Figure 7:
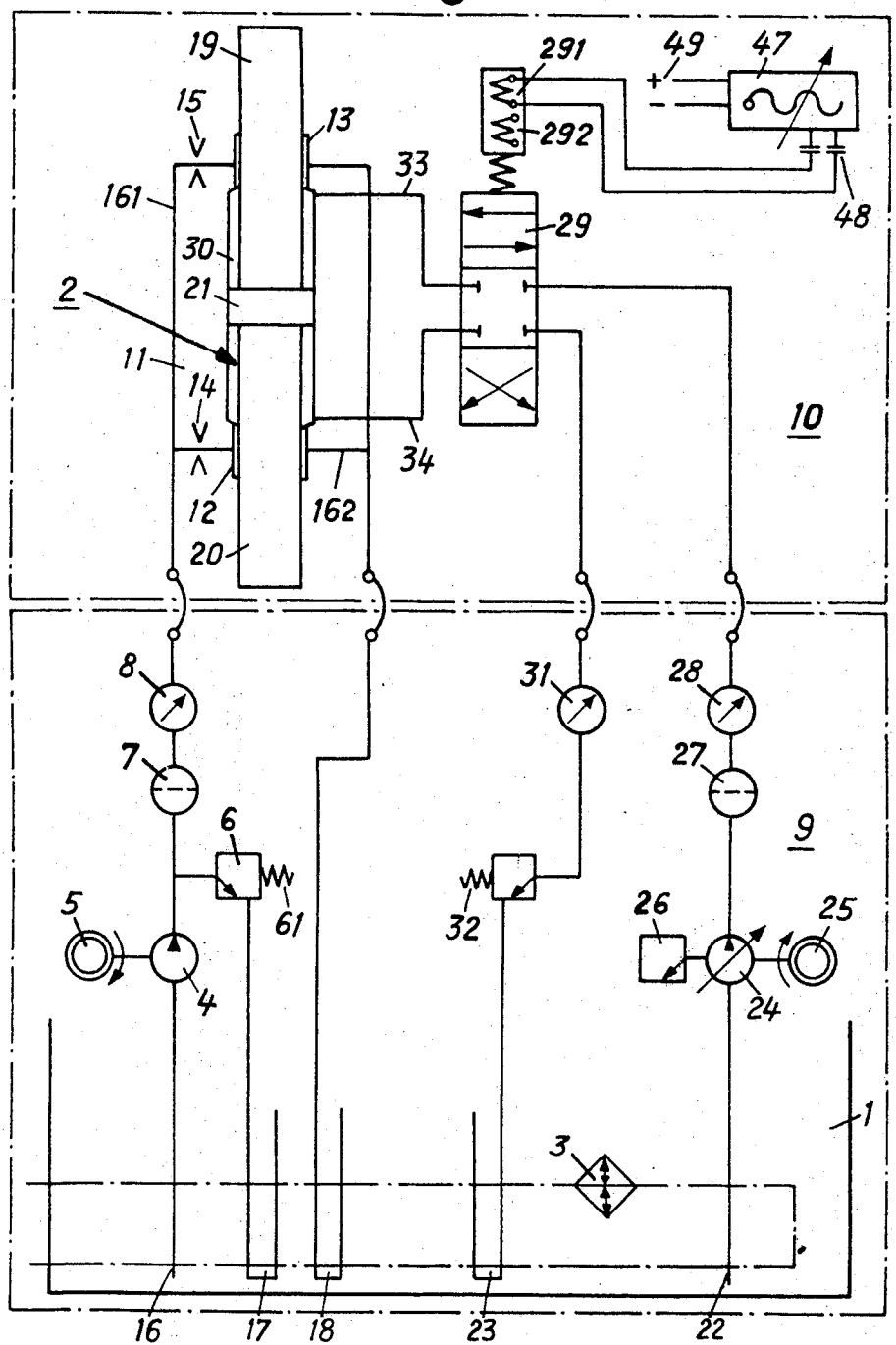

FIG. 7 depicts another constructional example with an addition in the control circuit of the control valve 29. Acting on the electro-magnetic coil 291 is a frequency converter 47 which is connected to such coil via a capacitor 48. This frequency converter 47 is fed with a control voltage 49. The frequency converter 47 can alter its output frequency. As a result, the electromagnetic coil 291 receives a so-called interfering frequency with the normal control voltage. Because of this so-called interfering frequency, the control valve 29 starts to vibrate gently, so that the flow openings of the control valve slide member, between the supply section 22 and return section 23, on the one hand, and the two pressure pipes 33, 34 on the other hand, are rhythmically enlarged or made smaller. In this way, the operational efficiency of the control circuit is improved. For example, if with the electro-erosive machining in the very small working gap of about 0.1 to 0.5 millimeter between the machining electrode and the workpiece, the dielectric liquid which is provided in known manner for ionizing the working gap after the individual working sparks no longer satisfactorily flushes out the eroded metal particles, the interfering frequency is able to impose small rhythmic movements on the spindle and thus the machining electrode in the working gap. By the rhythmic increase and reduction in size of the working gap, the flushing conditions for the dielectric liquid are improved.

Figure 8:
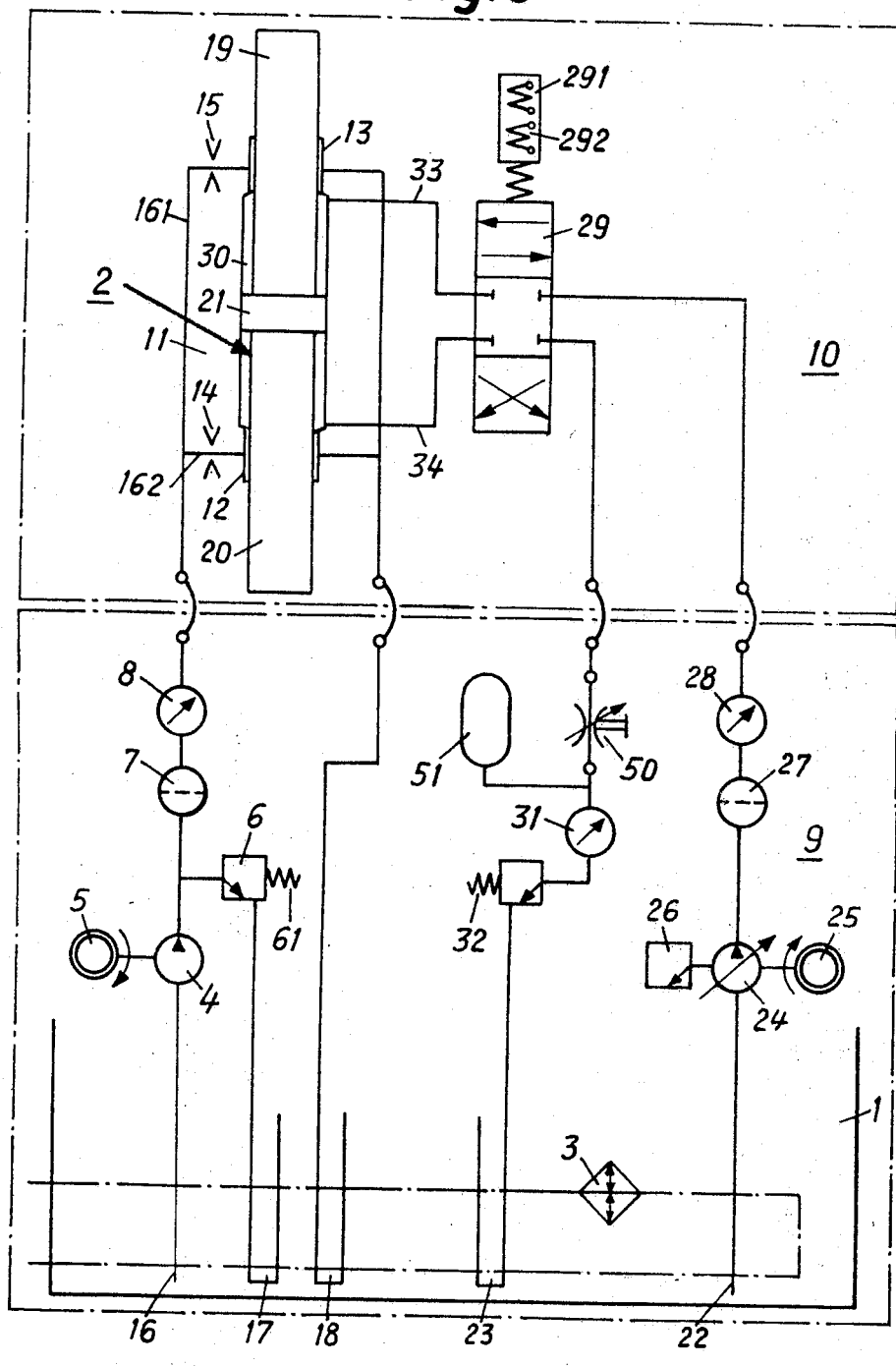

FIG. 8 basically shows the same arrangement as that of FIG. 1, except that in the return pipe 23, above the indicating instrument 31, there is provided an adjustable throttle valve 50 with a liquid storage device 51. By suitable setting of the throttle valve 50, the vibration of the power medium is obtained inside the complete control circuit. This vibration has the same purpose as the additional electrical arrangement with the frequency converter 47 of FIG. 7. Thus, in FIG. 8 it is also intended by hydraulic means to improve the flushing conditions of the dielectric liquid in the working gap.

FIG. 9 depicts one type of electro-erosive metal working machine. This machine essentially comprises the frame 70 which is connected with a table 72. A vessel or receptacle 73 is arranged upon the table 72. In this vessel 73 there is located the workpiece 75 which is to be machined and which is encircled by the dielectric liquid 74. An electrode 76 is positioned opposite the workpiece 75 and forms together with such the erosion or work gap 80. At the upper end of the machine frame 70 there is mounted the previously considered feed mechanism by means of the rails 77. The bearing housing 11 can move to and fro along these rails 77 in accordance with the requirements which occur during the machining operation. In this bearing housing 11 there are located all of the components as such have been depicted and described in conjunction with the previously explained figures. Moreover, by inspecting FIG. 9 it will be recognized that at the upper end of the bearing housing 11 there protrudes the piston rod 19 of the spindle 2 and at the lower end of the aforesaid housing the piston rod 20 of the same spindle 2. At the lower end of this piston rod 20 of such spindle 2 there is provided an attachment mechanism 20a for the electrode 76. Therefore, it is possible to imagine that all of the individual components of the feed mechanism or arrangement 10, as such has been described in connection with the preceding figures, are arranged in the electro-erosion machine of FIG. 9, and all individual components of the hydraulic installation 9 of the previously described figures are either arranged in the machine frame 70 or in a separate housing adjacent the electro-erosion machine.

The foregoing detailed description has been given for clearness of understanding only, and no unnecessary limitations should be understood therefrom, as modifications will be obvious to those skilled in the art.

Accordingly, we claim:

1. In an electro-erosion machine, a frame, hydraulically actuated means for mounting and controlling the movements of an electrode of such machine with respect to a work piece comprising a cylinder means having opposite open ends, a piston means disposed within said cylinder means and including a head and oppositely extending rod portions extending through and projecting beyond the opposite ends of said cylinder means, one of said projecting rod portions constituting an electrode support, a vertical guide track on said frame, a slide cooperably related with said guide track for movement therealong, and means connecting said slide to the other one of said projecting rod portions for restraining the same against turning movement about its axis while permitting its axial movement, means cooperably related between said cylinder means and rod portions at axially spaced locations of the cylinder means and defining pressure fluid accommodating chambers for receiving pressure fluid to apply transverse forces for pretensioning said rod portions and to provide a fluid bearing surface for supporting said rod portions, means for controllably supplying pressurized fluid to said chambers, means independent of said first mentioned means for controllably supplying and exhausting pressurized fluid to and from said cylinder means on opposite sides of said head of said piston means including electromagnetically operated valve means, control means for said electromagnetically operated valve means for actuating the same to impart controllable axial movement to said piston means, said rod portions and an electrode carried by one of said rod portions, said control means being constructed and arranged to actuate said electromagnetically operated valve means to impart axial movement to said piston means to effect at least one of a manually controlled electrode feed movement, an automatically regulated feed movement, and a feed movement including the imparting of vibrating movement to such a supported electrode, and fluid operated means cooperably related with the other of said projecting rod portions for releaseably clamping the same to permit axial movement of said cylinder means relative to said piston means responsive to actuation of said valve means to facilitate a coarse adjustment feed relation of said electrode support relative to a workpiece, upon subsequent release of said clamping means and axial movement of said piston means toward said workpiece.

References Cited

UNITED STATES PATENTS

| | | | |
|---|---|---|---|
| 2,660,485 | 11/1953 | Gerard | 308—9 |
| 2,762,946 | 9/1956 | Manchester. | |
| 2,989,616 | 6/1961 | Mironoff. | |
| 3,015,315 | 1/1962 | Strimel | 308—9 X |
| 3,257,306 | 6/1966 | Webb. | |

JOSEPH V. TRUHE, Primary Examiner

R. F. STAUBLY, Assistant Examiner

U.S. Cl. X.R.

91—262; 204—143; 308—9